US012615442B2

(12) United States Patent
Xu

(10) Patent No.: US 12,615,442 B2
(45) Date of Patent: Apr. 28, 2026

(54) VIDEO-BASED HIGH-IMAGE QUALITY IMAGE EXTRACTION PROCESSING METHOD AND APPARATUS, AND MOBILE TERMINAL

(71) Applicant: Huizhou TCL Cloud Internet Corporation Technology Co., Ltd., Huizhou (CN)

(72) Inventor: Nan Xu, Huizhou (CN)

(73) Assignee: Huizhou TCL Cloud Internet Corporation Technology Co., Ltd., Huizhou (CN)

( * ) Notice: Subject to any disclaimer, the term of this patent is extended or adjusted under 35 U.S.C. 154(b) by 221 days.

(21) Appl. No.: 18/571,231

(22) PCT Filed: Mar. 22, 2022

(86) PCT No.: PCT/CN2022/082339
§ 371 (c)(1),
(2) Date: Dec. 17, 2023

(87) PCT Pub. No.: WO2023/273431
PCT Pub. Date: Jan. 5, 2023

(65) Prior Publication Data
US 2024/0284057 A1 Aug. 22, 2024

(30) Foreign Application Priority Data
Jun. 28, 2021 (CN) .......................... 202110719103.3

(51) Int. Cl.
*H04N 23/80* (2023.01)
*H04N 23/951* (2023.01)
(52) U.S. Cl.
CPC ........... *H04N 23/80* (2023.01); *H04N 23/951* (2023.01)

(58) Field of Classification Search
CPC ...... H04N 5/2628; H04N 7/181; H04N 23/80; H04N 23/667; H04N 7/183; G08B 3/10; G08B 13/196
See application file for complete search history.

(56) References Cited

U.S. PATENT DOCUMENTS 8,164,636 B1 * 4/2012 Linzer ................ H04N 23/6811
348/333.12
2004/0202456 A1 * 10/2004 Sasagawa .............. H04N 5/772
386/E5.072
(Continued)

FOREIGN PATENT DOCUMENTS

CN 1312643 A 9/2001
CN 104580874 A 4/2015
(Continued)

OTHER PUBLICATIONS

International Search Report in International application No. PCT/CN2022/082339, mailed on Jun. 8, 2022.
(Continued)

*Primary Examiner* — Hung H Lam
(74) *Attorney, Agent, or Firm* — PV IP PC; Wei Te Chung

(57) ABSTRACT

Disclosed are a video-based high-image-quality image extraction processing method and apparatus, and a mobile terminal. The method comprises: acquiring a video file from which a picture needs to be extracted; selecting a designated segment in the video file for frame-by-frame playback; when a shutter instruction is detected, according to the result of frame-by-frame playback, extracting a key frame required to generate a picture from within the selected designated segment, and extracting specified frames before and after the key frame; and performing multi-frame synthesis on the (Continued)

extracted key frame and the specified frames before and after the key frame, and obtaining a target static image.

16 Claims, 3 Drawing Sheets

(56)                    References Cited

U.S. PATENT DOCUMENTS

| | | | | |
|---|---|---|---|---|
| 2009/0262218 | A1* | 10/2009 | Makii | H04N 5/53 |
| | | | | 348/333.01 |
| 2018/0302573 | A1* | 10/2018 | Zobel | H04N 23/951 |
| 2019/0045142 | A1* | 2/2019 | Zivkovic | H04N 23/673 |

FOREIGN PATENT DOCUMENTS

| | | |
|---|---|---|
| CN | 106101597 A | 11/2016 |
| CN | 106658141 A | 5/2017 |
| CN | 107181912 A | 9/2017 |
| CN | 108712603 A | 10/2018 |
| CN | 108765285 A | 11/2018 |
| CN | 109587546 A | 4/2019 |
| CN | 110072061 A | 7/2019 |
| CN | 111625670 A | 9/2020 |
| CN | 111935505 A | 11/2020 |
| CN | 111970561 A | 11/2020 |
| CN | 113542594 A | 10/2021 |
| JP | 2007274210 A | 10/2007 |

OTHER PUBLICATIONS

Written Opinion of the International Search Authority in International application No. PCT/CN2022/082339, mailed on Jun. 8, 2022.
Chinese Office Action issued in corresponding Chinese Patent Application No. 202110719103.3 dated Nov. 2, 2022, pp. 1-8.

* cited by examiner

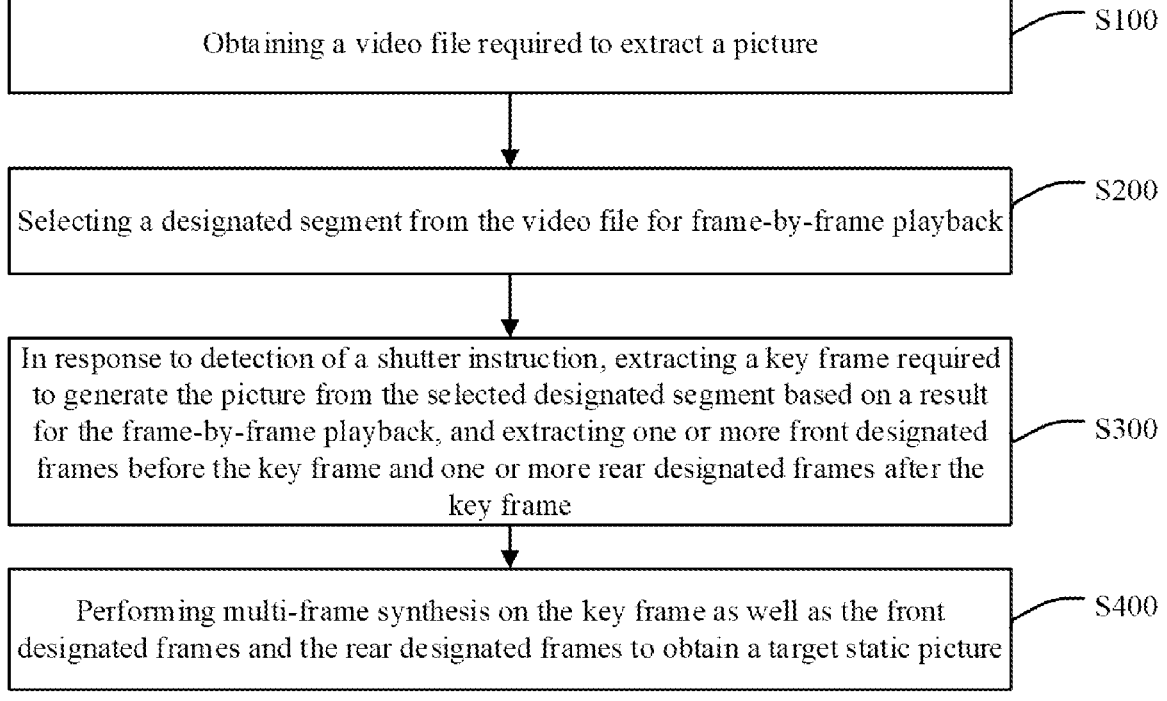

Obtaining a video file required to extract a picture ⌐ S100

Selecting a designated segment from the video file for frame-by-frame playback ⌐ S200

In response to detection of a shutter instruction, extracting a key frame required to generate the picture from the selected designated segment based on a result for the frame-by-frame playback, and extracting one or more front designated frames before the key frame and one or more rear designated frames after the key frame ⌐ S300

Performing multi-frame synthesis on the key frame as well as the front designated frames and the rear designated frames to obtain a target static picture ⌐ S400

FIG. 1

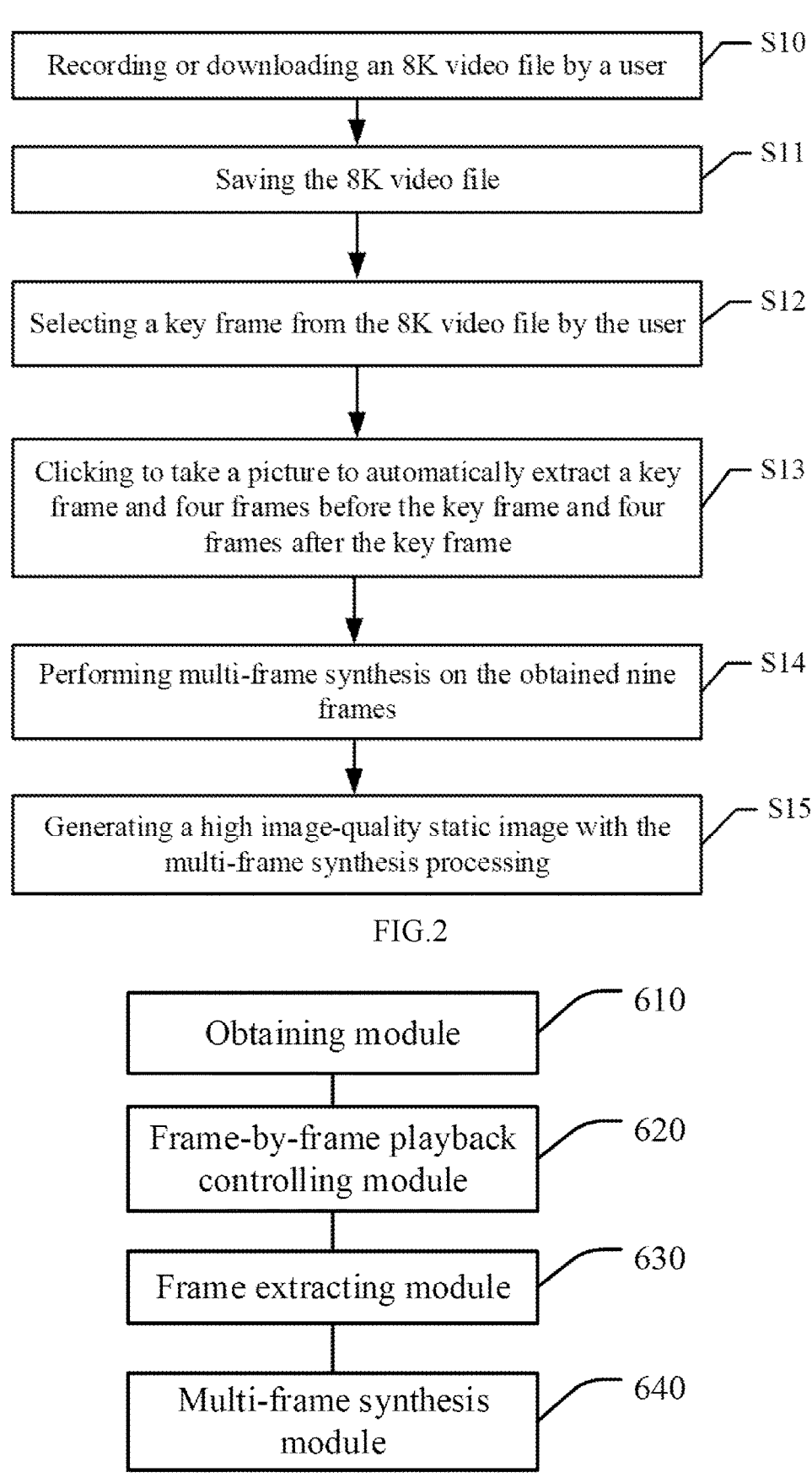

Recording or downloading an 8K video file by a user — S10

Saving the 8K video file — S11

Selecting a key frame from the 8K video file by the user — S12

Clicking to take a picture to automatically extract a key frame and four frames before the key frame and four frames after the key frame — S13

Performing multi-frame synthesis on the obtained nine frames — S14

Generating a high image-quality static image with the multi-frame synthesis processing — S15

FIG.2

Obtaining module — 610

Frame-by-frame playback controlling module — 620

Frame extracting module — 630

Multi-frame synthesis module — 640

VIDEO-BASED HIGH-IMAGE QUALITY IMAGE EXTRACTION PROCESSING METHOD AND APPARATUS, AND MOBILE TERMINAL

This application claims priority to Chinese Patent Application No. 202110719103.3, filed on Jun. 28, 2021, entitled "VIDEO-BASED HIGH-IMAGE-QUALITY IMAGE EXTRACTION PROCESSING METHOD AND APPARATUS, AND MOBILE TERMINAL", the disclosure of which is incorporated herein by reference in its entirety.

TECHNICAL FIELD

The present application relates to the field of mobile devices, and more particularly, to a lossless photographing method and apparatus for a mobile terminal, a terminal device, and a storage medium.

BACKGROUND

With the development of science and technology and the continuous improvement of people's living standards, various mobile terminals such as mobile phones become more and more popular, and the mobile phones have become indispensable communication tools in people's life.

There are more and more functions in the mobile phones in the related art, where photographing is one of the most commonly used functions.

SUMMARY

Technical Problems

However, for the photographing in the mobile phones in the related art, it is often necessary to capture a brilliant moment by continuous photographing. However, the continuous photographing is often not high in success rate and in a frame rate, and thus it is also possible to miss the brilliant moment, which is sometimes inconvenient for a user.

Therefore, an improvement and a development of the related art may be required.

Solutions to Problems

Technical Solutions

Technical problems to be solved by the present application is to provide a video-based high image-quality image extraction processing method and apparatus, a mobile terminal and a storage medium, aiming at the above-mentioned drawbacks of the related art. The present application provides a method for obtaining a high image-quality static picture by using a video recording technology, which provides convenience for a user.

In order to solve the above technical problems, technical solutions of the present application may be as follows.

A video-based high image-quality image extraction processing method is provided, including:

obtaining a video file required to extract a picture;

selecting a designated segment from the video file for frame-by-frame playback;

in response to detection of a shutter instruction, extracting a key frame required to generate the picture from the selected designated segment according to a result for the frame-by-frame playback, and extracting one or more front designated frames before the key frame and one or more rear designated frames after the key frame; and performing multi-frame synthesis on the key frame as well as the front designated frames and the rear designated frames to obtain a target static picture.

In the video-based high image-quality image extraction processing method, the method includes: before the obtaining of the video file, obtaining a photographing instruction to turn on a camera to record the video file.

In the video-based high image-quality image extraction processing method, the method includes: before the obtaining of the video file, downloading the video file over a network or extracting the video file from a local storage disk.

In the video-based high image-quality image extraction processing method, the video file is an 8K video file or a 4K video file.

In the video-based high image-quality image extraction processing method, the selecting of the designated segment includes:

receiving a selection instruction to select the designated segment from the video file according to the selection instruction for the frame-by-frame playback.

In the video-based high image-quality image extraction processing method, the extracting of the key frame and the extracting of the one or more front designated frames and the one or more rear designated frames include:

controlling the designated segment to perform the frame-by-frame playback; and in response to detection of the shutter instruction, extracting the key frame required to generate the picture from the designated segment being performing the frame-by-frame playback, and extracting one or more front designated frames before the key frame and one or more rear designated frames after the key frame;

where a sum of the number of the key frame, the number of the front designated frames, and the number of the rear designated frames is greater than or equal to 3.

In the video-based high image-quality image extraction processing method, the performing of the multi-frame synthesis on the key frame as well as the front designated frames and the rear designated frames includes:

performing multi-frame synthesis processing on the key frame as well as the front designated frames and the rear designated frames; and generating a high image-quality static image with the multi-frame synthesis processing to obtain a target static picture.

A video-based high image-quality image extraction processing apparatus is provided, including:

an obtaining module for obtaining a video file required to extract a picture;

a frame-by-frame playback controlling module for selecting a designated segment from the video file for frame-by-frame playback;

a frame extracting module for, in response to detection of a shutter instruction, extracting a key frame required to generate the picture from the selected designated segment according to a result for the frame-by-frame playback, and extracting one or more front designated frames before the key frame and one or more rear designated frames after the key frame; and a multi-frame synthesis module for performing multi-frame synthesis on the key frame as well as the front designated frames and the rear designated frames to obtain a target static picture.

A mobile terminal is provided, including: a memory, a processor, and a video-based high image-quality image extraction processing program stored on the memory and operable on the processor, where the video-based high image-quality image extraction processing program, when executed by the processor, implements operations of the video-based high image-quality image extraction processing method of any of foregoings.

A computer-readable storage medium is provided, having stored thereon a video-based high image-quality image extraction processing program, where the video-based high image-quality image extraction processing program, when executed by a processor, implements operations of the video-based high image-quality image extraction processing method of any of foregoings.

Beneficial Effects of Invention

Beneficial Effects

The beneficial effects are in comparison with the related art that the present application provides a video-based high-image-quality image extraction processing method, where the method includes: obtaining a video file required to extract a picture; selecting a designated segment from the video file for frame-by-frame playback; in response to detection of a shutter instruction, extracting a key frame required to generate the picture from the selected designated segment according to a result for the frame-by-frame playback, and extracting one or more front designated frames before the key frame and one or more rear designated frames after the key frame; and performing multi-frame synthesis on the key frame as well as the front designated frames and the rear designated frames to obtain a target static picture. According to the present application, an 8 k video is used, and a frame rate of the video is set to 30/60/120 fps to perform video recording on an imminent brilliant moment. The video is stored and then played in Gallery. After the video will be played up to the imminent brilliant moment, the user can play the video frame by frame. Until the brilliant moment is seen. A shutter button is provided in the Gallery to extract an 8 k frame at this moment as a base frame, and 4 frames before the base frame and 4 frames after the base frame are extracted further. The high image-quality static image can be obtained by performing multi-frame synthesis on 8 frames of the 8 k video frames and the 8 k base frame. The present application enables the mobile terminal to have a new function of extracting a photographing picture with the high image-quality images in the video, which can obtain the high image-quality static picture by using a video recording technology, thereby providing convenience for a user. The present application has following advantages:

1) the user can still obtain a high image-quality static image by using the 8 k video to perform a subsequent photographing without live photographing.
2) A larger number of high image-quality static pictures can be obtained with the 8 k video.

BRIEF DESCRIPTION OF THE DRAWINGS

Description of the Drawings

Figure 4:
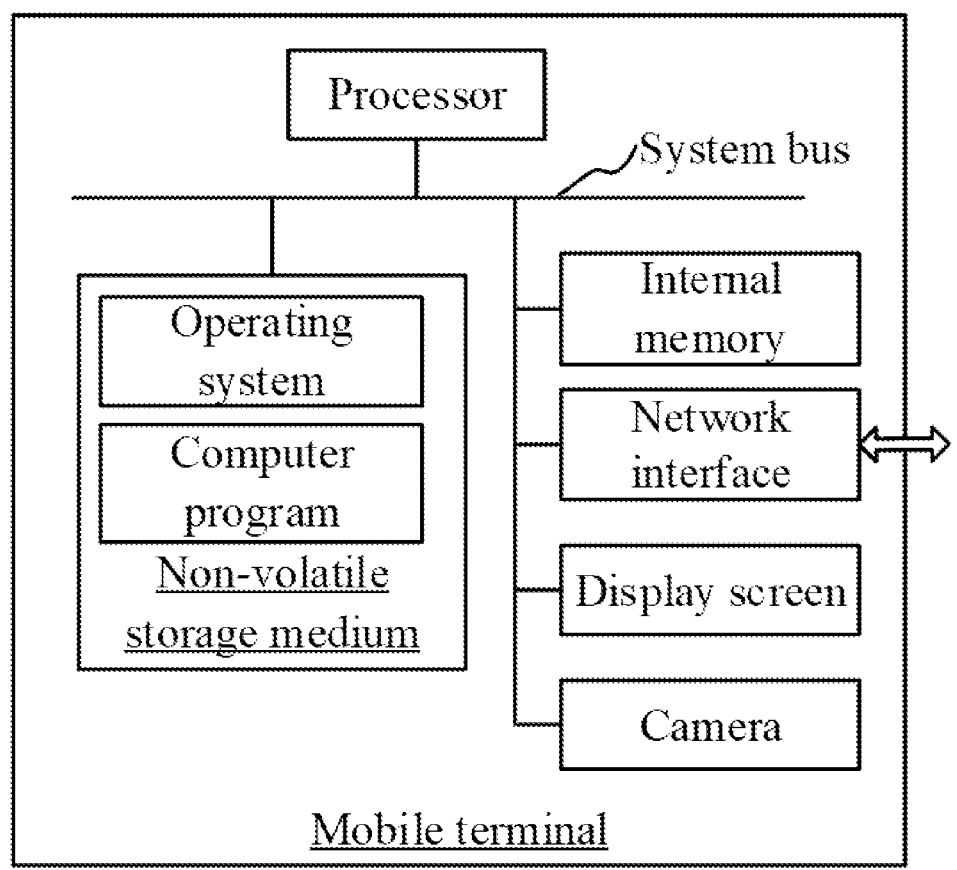

FIG. 1 is a flowchart of a specific embodiment of a video-based high image-quality image extraction processing method according to an embodiment of the present application.

FIG. 2 is a flowchart diagram of detecting whether a mobile terminal has an incoming call according to an embodiment of the present application.

FIG. 3 is a schematic block diagram of a video-based high image-quality image extraction processing apparatus according to some embodiments of the present application.

FIG. 4 is a schematic diagram of an internal structure of a terminal device according to some embodiments of the present application.

EMBODIMENTS OF INVENTION

Detailed Description

To make the objectives, technical solutions, and effects of the present application more clear and definite, the present application is illustrated in detail below by referring to the accompanying drawings and illustrating the embodiments. It should be understood that the specific embodiments described here are only used to explain the present application, and are not used to limit the present application.

It should be noted that all directional indications (such as up, down, left, right, front, back, etc.) in the embodiments of the present application are only intended to explain a relative positional relationship, a motion situation, and the like between components in a particular pose (as shown in the drawings), and if the particular pose changes, the directional indication changes accordingly.

In addition, if terms "first", "second" or the like are involved in the embodiments of the present disclosure, the terms are for illustrative purposes only and are not to be construed as indicating or imposing a relative importance or implicitly indicating the number of technical features indicated. Thus, a feature that limited by "first", "second" may expressly or implicitly include at least one of the features. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present application.

With the development of science and technology and the continuous improvement of people's living standards, various mobile terminals such as mobile phones become more and more popular, and the mobile phones have become indispensable communication tools in people's life.

It has been found that there are more and more functions in the mobile phones in the related art, where photographing is one of the most commonly used functions. Users often prefer to take pictures with their mobile phones when they go out and see good scenery.

However, for the photographing in the mobile phones in the related art, it is often necessary to capture a brilliant moment by continuous photographing. However, the continuous photographing is often not high in success rate and in a frame rate, and thus it is also possible to miss the brilliant moment, which is sometimes inconvenient for a user.

The progress of cameras of the mobile phones is obvious to all, and the integrated card machine has been dying, which is the victim of the rise of the cameras of the mobile phones. However, compared with a single-lens reflex camera and/or a mirrorless camera, the image-quality of the mobile phones is still far away, which is not completely unshrinkable and can be solved by the present application.

In order to solve the above problems, an embodiment of the present invention provides a video-based high-image-quality image extraction processing method. The method can obtain a video file required to extract a picture; select a designated segment from the video file for frame-by-frame playback; in response to detection of a shutter instruction, extract a key frame required to generate the picture from the selected designated segment according to a result for the frame-by-frame playback, and extract one or more front designated frames before the key frame and one or more rear designated frames after the key frame; and perform multi-frame synthesis on the key frame as well as the front designated frames and the rear designated frames to obtain a target static picture. Therefore, it provides convenience for a user and improves user experience.

The multi-frame synthesis of the cameras of the mobile phones has a good foundation. If you are concerned about a technical progress of a photosensitizer of the mobile phone, it is found that there is a parameter that is soaring in multiple times, that is, a frame rate of the continuous photographing. To date, most models of mainstream photoreceptors have been able to provide a full pixel continuous photographing speed in excess of 20 FPS-30 FPS. At the same time, the continuous photographing speed of the middle-high-level mirrorless camera and/or single-lens reflex camera is about 10 FPS, which means that the speed at which the photoreceptor obtains the full-pixel sample is 2-3 times as fast as the single-lens reflex camera and/or the mirrorless camera, and has the value of multi-frame application. The mobile phones are excellent in terms of data processing capacity. With strong processor performance and flexible software systems, the mobile phones have an extensive and profound material basis for using the multi-frame synthesis technology.

Exemplary Method

First Embodiment

As shown in FIG. 1, an embodiment of the present application provides a video-based high image-quality image extraction processing method that can be used in a mobile device such as a mobile phone or a tablet computer. In the embodiment of the present application, the method includes following steps S100-S400.

At step S100, a video file required to extract a picture is obtained.

In the embodiment of the present application, based on the problem of low success rate of high image-quality picture photographing in the related art, high image-quality picture photographing extraction is performed in a video file. The video file in the embodiment of the present application may be a high quality video file photographed live, or may be a video file downloaded over the network or selected from the local storage disk. In the present embodiment, the video file is preferably selected as a video file having a high image-quality image such as an 8K video file or a 4K video file.

In a first type of live photographing of obtaining the video file, a photographing instruction is obtained, for example, by a mobile terminal such as a mobile phone, to turn on a camera to record an 8K video file or a 4K video file. For example, a user may photograph an 8 k video by using the mobile terminal, and a frame rate of the video is set to 30/60/120 fps to perform video recording on an imminent brilliant moment. The user can perform the photographing at any time conveniently, thereby providing convenience for the user.

In a second type of obtaining the video file, the 8K video file or the 4K video file required to extract the picture can be downloaded over a network or extracted from a local storage disk in the embodiment of the present application. Various data can be obtained, and obtaining of the video file is very convenient.

At step S200, a designated segment is selected from the video file for frame-by-frame playback.

In the embodiment of the present application, when a user has selected the video file required to extract the picture, the video file may be previewed to select a designated segment that is preferred or brilliant by the user from the video file for frame-by-frame playback.

For example, the user mobile terminal receives a selection instruction to select a designated segment from the video file according to the selection instruction for the frame-by-frame playback. In the present embodiment, it is preferable to select a designated segment that is preferred or brilliant by the user for the frame-by-frame playback, and to facilitate the user to view and select a desired key frame according to the situation during the frame-by-frame playback.

At step S300, in response to detection of a shutter instruction, a key frame required to generate the picture is extracted from the selected designated segment according to a result for the frame-by-frame playback, and one or more front designated frames before the key frame and one or more rear designated frames after the key frame are extracted.

In the embodiment of the present application, when the user sees a frame that is preferred by the user during the frame-by-frame playback of the designated segment selected by the user, the user can operate a shutter button to obtain the frame. In the embodiment of the present application, when a shutter instruction is detected by the mobile terminal, a key frame required to generate the picture is extracted from the selected designated segment according to a result for the frame-by-frame playback, and one or more front designated frames before the key frame and one or more rear designated frames after the key frame are extracted.

Specifically, a mobile terminal, such as a mobile phone, controls the selected designated segment for frame-by-frame playback. When the user sees a frame that is preferred by the user during the frame-by-frame playback of the designated segment. When a shutter instruction is detected by the mobile terminal, a key frame required to generate the picture can be extracted from the designated segment being performing the frame-by-frame playback, and one or more front designated frames before the key frame and one or more rear designated frames after the key frame can be extracted.

where a sum of the number of the key frame, the number of the front designated frames, and the number of the rear designated frames is greater than or equal to 3.

For example, in a preferred embodiment of the present application, one key frame preferred by a user is selected, four frames before the key frame are selected, and four frames after the key frame are selected, i.e., a total of 9 frames are used later for multi-frame synthesis.

At step S400, multi-frame synthesis is performed on the key frame as well as the front designated frames and the rear designated frames to obtain a target static picture.

In the embodiments of the present application, multi-frame synthesis can be performed on the key frame as well as the front designated frames and the rear designated frames to obtain a target static picture.

Specifically, as described in the above steps, the present application performs multi-frame synthesis processing on the key frame as well as the front designated frames and the rear designated frames, and generates a high image-quality static image with the multi-frame synthesis processing to obtain a target static picture. For example, as described in the previous embodiment, a user may select one key frame preferred by the user, four frames before the key frame, and four frames after the key frame, i.e., a total of 9 frames are selected, and then the high image-quality static image is generated with the multi-frame synthesis processing to obtain the target static picture. The obtained target picture is a clear picture with high image-quality.

The multi-frame synthesis processing in the embodiments of the present application is a strategy taken at the time of photographing in order to obtain a picture having better quality. Although one picture taken every time in the related art may be of poor quality, the present application can obtain a high image-quality picture by taking advantage of a plurality of consecutive frames of images in a video file and draw on others successful experience. The present application can synthesize a high quality such as an ultrahigh-definition picture of 24 million pixels by extracting a best part from continuous multi-frame images. That is, the obtained target picture is a high image-quality clear picture.

The method of the present application is described in further detail below by a specific application embodiment.

As shown in FIG. 2, a specific application embodiment of a video-based high image-quality image extraction process-ing method of the present application includes following steps S10-S15.

At step S10, the user records or downloads an 8K video file.

That is, in a specific application embodiment of the present application, a video file may be recorded by a user. For example, an 8 k video may be used, and a frame rate of the video is set to 30/60/120 fps to perform video recording on an imminent brilliant moment. That is, the picture extrac-tion of the present application may be performed by using the 8 k video to perform subsequent photographing. It is of course also possible to download an 8K video file over a network.

At step S11, the 8K video file is saved.

In the embodiment of the present application, after the recorded video file is saved, the video file can be played in Gallery (a preview interface).

At step S12, the user selects a key frame from the 8K video file.

In the embodiment of the present application, after the video will be played up to the imminent brilliant moment, the user can play the video frame by frame. Until the brilliant moment is seen.

At step S13, the user clicks to take a picture to automati-cally extract a key frame and four frames before the key frame and four frames after the key frame.

In the embodiment of the present application, a shutter button is provided in the Gallery (the preview interface), an 8 k frame at this time is extracted as a base frame (the key frame), and four frames of the base frame (the key frame) and four frames of the based frame are further extracted.

At step S14, multi-frame synthesis processing is per-formed on the obtained nine frames.

At step S15, a high image-quality static image is gener-ated with the multi-frame synthesis processing.

In the embodiment of the present application, a high image-quality static image can be obtained by performing multi-frame synthesis processing on the 8 frames of 8 k video frames and the 8 k base frame. Thus, in the embodi-ment of the present application, a brilliant frame is extracted from the 8 k video, and then multi-frame synthesis process-ing is performed on the brilliant frame to obtain a high image-quality image.

According to the present application, a multi-frame noise reduction processing is used in the multi-frame synthesis processing. Imaging noise points is in fact disordered, that is, a noise point in this position on the previous picture may be a red noise point, and the noise point in the same position in the next picture may be a green noise point, which results in a comparison condition, so that it can be easier to screen out the noise points. For example, if there are red and green points in a picture in continuous frames representing the noise points, of course, this is just an example, and there will not be such huge exaggerated noises. An area where the noise points are overlapped can get white spots, which can be further processed according to further algorithm to per-form color guess processing and interpolation processing, so as to achieve the effect of removing the noise points. This method is very effective for dealing with common red and green noise points.

At the same time, multi-frame digital anti-shaking is used in the multi-frame synthesis processing of the present appli-cation and is a pure digital anti-shaking technology. The basic principle of the anti-shaking is that a single frame is split into multiple frames for photographing, and then the multi frames are aligned and synthesized.

Then, a static picture of higher resolution is generated by performing multi-frame synthesis on the multiple frames in the video file.

Of course, the 8 k video file is not necessarily used in the implementation of the present application. Alternatively, 4 k or other high-resolution video file can be used in the implementation of the present application and can be com-patible with much more formats. In the embodiments of the present application, the number of multiple frames for the multi-frame synthesis is not necessarily 9 frames. Alterna-tively, another scheme for synthesizing more than 2 frames can be also used.

As a result, the present application enables the mobile terminal to have a new function of extracting a photograph-ing picture with the high image-quality images in the video, which can obtain the high image-quality static picture by using a video recording technology, thereby providing con-venience for a user. The present application has following advantages:

1) the user can still obtain a high image-quality static image by using the 8 k video to perform a subsequent photographing without live photographing.

2) A larger number of high image-quality static pictures can be obtained with the 8 k video.

Exemplary Device

As shown in FIG. 3, an embodiment of the present application provides a video-based high image-quality image extraction processing apparatus. The apparatus may include:

an obtaining module 610 for obtaining a video file required to extract a picture;

a frame-by-frame playback controlling module 620 for selecting a designated segment from the video file for frame-by-frame playback;

a frame extracting module 630 for, in response to detec-tion of a shutter instruction, extracting a key frame required to generate the picture from the selected designated segment according to a result for the frame-by-frame playback, and extracting one or more front designated frames before the key frame and one or more rear designated frames after the key frame; and a multi-frame synthesis module 640 for performing multi-frame synthesis on the key frame as well as the front designated frames and the rear designated frames to obtain a target static picture, as described above.

Based on the embodiments described above, a terminal device may be further provided in yet another embodiment of the present application, of which a schematic structural diagram can be shown in FIG. 4. The terminal device includes a processor, a memory, a network interface, a display screen, and a camera connected through a system bus. The processor of the terminal device is configured to provide computing and control capabilities. The memory of the terminal device includes a non-volatile storage medium and an internal memory. The non-volatile storage medium stores an operating system and a computer program. The internal memory provides an environment for the operation of the operating system and the computer program in the non-volatile storage medium. The network interface of the terminal device is configured to be in communication with an external terminal through a network connection. The computer program, when executed by the processor, implements a video-based high image-quality image extraction processing. The display screen of the terminal device may be a liquid crystal display screen or an electronic ink display screen.

It should be understood by those skilled in the art that the schematic structural diagram in FIG. 4 is merely a block diagram of a portion of the structure associated with the solution of the present application and does not constitute a definition of the terminal device to which the solution of the present application is applied. A particular terminal device may include more or fewer components than shown, or some combination of components, or have different arrangements of components.

A terminal device is provided in an embodiment, includes: a memory, a processor, and a video-based high image-quality image extraction processing program stored on the memory and operable on the processor, where the program, when executed by the processor, performs operations including:

obtaining a video file required to extract a picture;

selecting a designated segment from the video file for frame-by-frame playback;

in response to detection of a shutter instruction, extracting a key frame required to generate the picture from the selected designated segment according to a result for the frame-by-frame playback, and extracting one or more front designated frames before the key frame and one or more rear designated frames after the key frame; and performing multi-frame synthesis on the key frame as well as the front designated frames and the rear designated frames to obtain a target static picture.

The method includes: before the obtaining of the video file, obtaining a photographing instruction to turn on a camera to record the video file.

The method includes: before the obtaining of the video file, downloading the video file over a network or extracting the video file from a local storage disk.

The video file is an 8K video file or a 4K video file.

The selecting of the designated segment from the video file includes:

receiving a selection instruction to select the designated segment from the video file according to the selection instruction for the frame-by-frame playback.

The extracting of the key frame and extracting of the one or more front designated frames and one or more rear designated frames include:

controlling the designated segment to perform the frame-by-frame playback; and in response to detection of the shutter instruction, extracting the key frame required to generate the picture from the designated segment being performing the frame-by-frame playback, and extracting one or more front designated frames before the key frame and one or more rear designated frames after the key frame;

where a sum of the number of the key frame, the number of the front designated frames, and the number of the rear designated frames is greater than or equal to 3.

The performing of the multi-frame synthesis on the key frame as well as the front designated frames and the rear designated frames includes:

performing multi-frame synthesis processing on the key frame as well as the front designated frames and the rear designated frames; and generating a high image-quality static image with the multi-frame synthesis processing to obtain a target static picture.

It should be understood by those of ordinary skill in the art that all or a portion of the flows of implementing the methods of the embodiments described above may be accomplished by a computer program instructing relevant hardware that may be stored in a non-volatile computer-readable storage medium that, when executed, may include the flows of the method embodiments described above. Any reference to memory, storage, database or other medium used in the embodiments provided in the present application may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, the RAM may be available in a variety of forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) RAM (RDRAM), direct memory bus dynamic RAM (DRDRAM), and memory bus dynamic RAM (RDRAM).

In summary, the present application discloses a video-based high image-quality image extraction processing method and apparatus, a mobile terminal, and a storage medium.

The method includes: obtaining a video file required to extract a picture; selecting a designated segment from the video file for frame-by-frame playback; in response to detection of a shutter instruction, extracting a key frame required to generate the picture from the selected designated segment according to a result for the frame-by-frame playback, and extracting one or more front designated frames before the key frame and one or more rear designated frames after the key frame; and performing multi-frame synthesis on the key frame as well as the front designated frames and the rear designated frames to obtain a target static picture. According to the present application, an 8 k video is used, and a frame rate of the video is set to 30/60/120 fps to perform video recording on an imminent brilliant moment.

The video is stored and then played in Gallery. After the video will be played up to the imminent brilliant moment, the user can play the video frame by frame. Until the brilliant moment is seen. A shutter button is provided in the Gallery to extract an 8 k frame at this moment as a base frame, and the first 4 frames and the last 4 frames of the base frame are extracted further. The high image-quality static image can be obtained by performing multi-frame synthesis on 8 frames of the 8 k video frames and the 8 k base frame. The present application enables the mobile terminal to have a new function of extracting a photographing picture with the high image-quality images in the video, which can obtain the high image-quality static picture by using a video recording technology, thereby providing convenience for a user. The present application has following advantages:

1) the user can still obtain a high image-quality static image by using the 8 k video to perform a subsequent photographing without live photographing.

2) A larger number of high image-quality static pictures can be obtained with the 8 k video.

Finally, it should be noted that the aforesaid embodiments are only intended to explain but not to limit the technical solutions of the present application. Although the present application has been explained in detail with reference to the above-described embodiments, the person of ordinary skill in the art may understand that, the technical solutions described in each of the embodiments mentioned above may still be amended, or some technical features in the technical solutions may be replaced equivalently; these amendments or equivalent replacements, which doesn't cause the essence of the corresponding technical solution to be broken away from the spirit and the scope of the technical solution in various embodiments of the present application, should all be included in the protection scope of the present application.

What is claimed is:

1. A video-based high image-quality image extraction processing method, comprising:

obtaining a video file required to extract a picture;

selecting a designated segment from the video file for frame-by-frame playback;

in response to detection of a shutter instruction, extracting a key frame required to generate the picture from the selected designated segment based on a result for the frame-by-frame playback, and extracting one or more front designated frames before the key frame and one or more rear designated frames after the key frame; and performing multi-frame synthesis on the key frame as well as the front designated frames and the rear designated frames to obtain a target static picture;

wherein the performing of the multi-frame synthesis comprises:

performing multi-frame synthesis on the key frame as well as the one or more front designated frames and the one or more rear designated frames based on multi-frame noise reduction processing to obtain the target static picture, wherein the performing of multi-frame synthesis on the key frame as well as the front designated frames and the rear designated frames based on multi-frame noise reduction processing comprises:

determining an area in which noise points overlap between target consecutive frames, wherein the target consecutive frames are consecutive frames among all of the key frame and one or more front designated frames and the one or more rear designated frames;

performing color guess processing and interpolation processing on the area to perform noise reduction; and performing multi-frame synthesis on the key frame as well as the front designated frames and the rear designated frames based on a result for the noise reduction to obtain the target static picture.

2. The method of claim 1, further comprising: before the obtaining of the video file, obtaining a photographing instruction to turn on a camera to record the video file.

3. The method of claim 1, further comprising: before the obtaining of the video file, downloading the video file over a network or extracting the video file from a local storage disk.

4. The method of claim 1, wherein the video file is an 8K video file or a 4K video file.

5. The method of claim 1, wherein the selecting of the designated segment comprises:

receiving a selection instruction to select the designated segment from the video file based on the selection instruction for the frame-by-frame playback.

6. The method of claim 1, wherein the selecting of the designated segment comprises:

in responsive to a selection operation for the video file, previewing the video file; and in responsive to a segment selection operation for the previewed video file, selecting the designated segment from the video file for frame-by-frame playback.

7. The method of claim 1, wherein the extracting of the key frame and the extracting of the one or more front designated frames and the one or more rear designated frames comprise:

controlling the selected designated segment to perform the frame-by-frame playback; and in response to detection of the shutter instruction, extracting the key frame required to generate the picture from the designated segment being performing the frame-by-frame playback, and extracting one or more front designated frames before the key frame and one or more rear designated frames after the key frame;

wherein a sum of a number of the key frame, a number of the front designated frames, and a number of the rear designated frames is greater than or equal to 3.

8. The method of claim 1, wherein the extracting of the one or more front designated frames and the one or more rear designated frames comprises:

extracting four frames before the key frame, and extracting four frames after the key frame.

9. The method of claim 1, wherein the extracting of the key frame comprises:

in response to detection of the shutter instruction by a shutter button in a preview interface, extracting the key frame required to generate the picture from the designated segment being performing the frame-by-frame playback.

10. The method of claim 1, wherein the performing of the multi-frame synthesis comprises:

performing multi-frame synthesis processing on the key frame as well as the front designated frames and the rear designated frames; and generating a high image-quality static image with the multi-frame synthesis processing to obtain the target static picture.

11. The method of claim 1, wherein the performing of the multi-frame synthesis comprises:

performing multi-frame synthesis on the key frame as well as the one or more front designated frames and the one or more rear designated frames based on multi-frame digital anti-shake to obtain the target static picture.

12. The method of claim 1, wherein a frame rate of the video file is 30 frames per second or 60 frames per second or 120 frames per second.

13. A mobile terminal, comprising:
a memory;
a processor; and
a video-based high image-quality image extraction processing program stored on the memory and operable on the processor,
wherein the video-based high image-quality image extraction processing program, when executed by the processor, implements a video-based high image-quality image extraction processing method, comprising:
obtaining a video file required to extract a picture;
selecting a designated segment from the video file for frame-by-frame playback;
in response to detection of a shutter instruction, extracting a key frame required to generate the picture from the selected designated segment based on a result for the frame-by-frame playback, and extracting one or more front designated frames before the key frame and one or more rear designated frames after the key frame; and
performing multi-frame synthesis on the key frame as well as the front designated frames and the rear designated frames to obtain a target static picture;
wherein the performing of the multi-frame synthesis comprises:
performing multi-frame synthesis on the key frame as well as the one or more front designated frames and the one or more rear designated frames based on multi-frame noise reduction processing to obtain the target static picture;
wherein the performing of multi-frame synthesis on the key frame as well as the front designated frames and the rear designated frames based on multi-frame noise reduction processing comprises:
determining an area in which noise points overlap between target consecutive frames, wherein the target consecutive frames are consecutive frames among all of the key frame and one or more front designated frames and the one or more rear designated frames;
performing color guess processing and interpolation processing on the area to perform noise reduction; and
performing multi-frame synthesis on the key frame as well as the front designated frames and the rear designated frames based on a result for the noise reduction to obtain the target static picture.

14. The mobile terminal of claim 13, wherein the extracting of the key frame comprises:
in response to detection of the shutter instruction by a shutter button in a preview interface, extracting the key frame required to generate the picture from the designated segment being performing the frame-by-frame playback.

15. The mobile terminal of claim 13, wherein the performing of the multi-frame synthesis comprises:
performing multi-frame synthesis processing on the key frame as well as the front designated frames and the rear designated frames; and
generating a high image-quality static image with the multi-frame synthesis processing to obtain the target static picture.

16. A non-transitory computer-readable storage medium having stored thereon a video-based high image-quality image extraction processing program, wherein the video-based high image-quality image extraction processing program, when executed by a processor, implements a video-based high image-quality image extraction processing method, comprising: obtaining a video file required to extract a picture; selecting a designated segment from the video file for frame-by-frame playback; in response to detection of a shutter instruction, extracting a key frame required to generate the picture from the selected designated segment based on a result for the frame-by-frame playback, and extracting one or more front designated frames before the key frame and one or more rear designated frames after the key frame; and performing multi-frame synthesis on the key frame as well as the front designated frames and the rear designated frames to obtain a target static pictures wherein the performing of the multi-frame synthesis comprises: performing multi-frame synthesis on the key frame as well as the one or more front designated frames and the one or more rear designated frames based on multi-frame noise reduction processing to obtain the target static picture; wherein the performing of multi-frame synthesis on the key frame as well as the front designated frames and the rear designated frames based on multi-frame noise reduction processing comprises: determining an area in which noise points overlap between target consecutive frames, wherein the target consecutive frames are consecutive frames among all of the key frame and one or more front designated frames and the one or more rear designated frames; performing color guess processing and interpolation processing on the area to perform noise reduction; and performing multi-frame synthesis on the key frame as well as the front designated frames and the rear designated frames based on a result for the noise reduction to obtain the target static picture.

* * * * *